March 8, 1955  L. E. RAUSENBERGER  2,703,868
MULTIPLE SLIP RING JOINT

Filed Aug. 14, 1953  2 Sheets-Sheet 1

INVENTOR.
LAWRENCE E. RAUSENBERGER
BY
Marechal Biebel French & Bugg
ATTORNEYS

March 8, 1955  L. E. RAUSENBERGER  2,703,868
MULTIPLE SLIP RING JOINT

Filed Aug. 14, 1953  2 Sheets-Sheet 2

INVENTOR.
LAWRENCE E. RAUSENBERGER
BY
ATTORNEYS

United States Patent Office 2,703,868
Patented Mar. 8, 1955

2,703,868

MULTIPLE SLIP RING JOINT

Lawrence E. Rausenberger, Springfield, Ohio, assignor to The Steel Products Engineering Company, Springfield, Ohio, a corporation of Ohio Application August 14, 1953, Serial No. 374,272

6 Claims. (Cl. 339—5)

This invention relates to a multiple slip ring joint for use in electric equipment.

This invention has special relation to electrical equipment wherein it is desired to transfer a large number of electric circuits between a stationary base and a rotary member, and one of the primary objects of the invention is to provide a multiple slip ring joint for such uses which is of relatively small and compact size while still offering all necessary shielding for the several circuits.

The invention also has particular relation to electrical installations such for example as radar tracking units wherein the circuits to be transferred between a base and a rotary member include a large number of relatively high load circuits requiring maximum shielding and also a large number of comparatively low load circuits having less severe shielding requirements, and another object of this invention is to provide a multiple slip ring joint for use in such installations in which a plurality of sets of rings and brushes are arranged in concentric relation to enable the high load circuits to be transmitted through the central portion of the unit for maximum shielding while the low load circuits are transmitted through an outer set of brushes and rings and thereby to provide such a multiple circuit unit which will occupy only a practical and reasonable amount of space.

An additional object of the invention is to provide a composite ring unit especially suitable for use in a multiple slip joint of comparatively small axial dimensions which includes a plurality of relatively thin and flat contact rings and insulating rings arranged in both axially and radially offset relation to present flat annular contact ring surfaces adapted for cooperation with a corresponding plurality of axially and radially offset brushes to transmit a corresponding plurality of circuits in a relatively small axial space.

It is also an object of the invention to provide a composite ring unit for a slip ring joint in which the individual rings are radially offset in both directions from the center of the unit to give a double ended stepped conical configuration adapted for use with a pair of sets of brushes contacting both sets of ring surfaces therein.

Still another object of the invention is to provide a composite ring unit as outlined above in which the several contact rings and insulating rings in each composite ring are of the same inner diameter but of progressively different outer diameters to establish the desired stepped conical configuration of the composite ring while facilitating the necessary fixed connections to the rings at the inner periphery thereof.

Other objects and advantages of the invention will be apparent from the following description, the accompanying drawings and the appended claims.

In the drawings—

Figure 1:
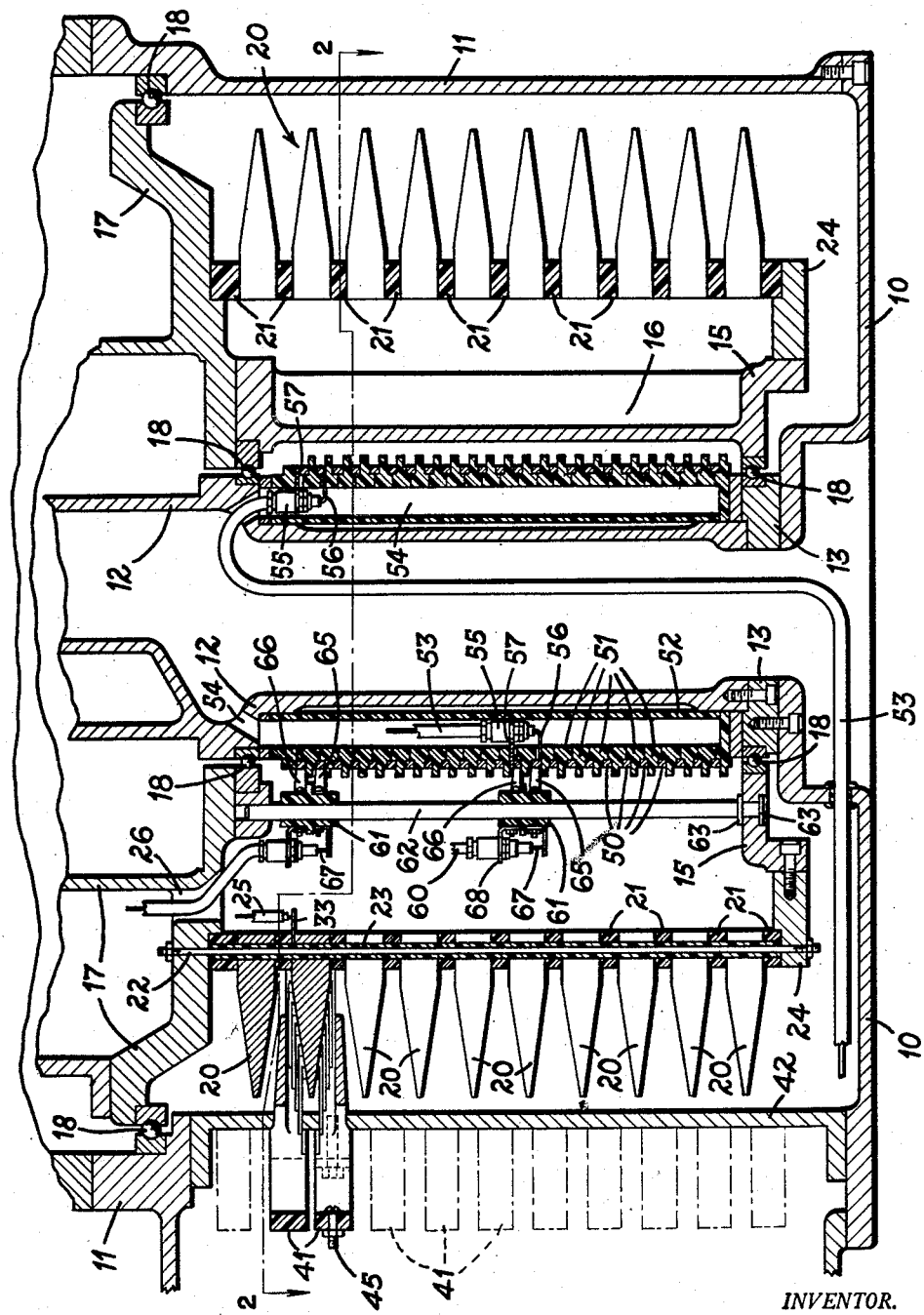
Fig. 1 is a sectional view showing a multiple slip ring joint constructed in accordance with the invention, the view being taken substantially on the line 1—1 of Fig. 2.

Referring to the drawings, which illustrate a preferred embodiment of the invention, the stationary base 10 includes an upstanding wall 11 and a hollow central stand 12 which is secured to the base through the clamp ring 13. The rotary member of the unit includes a sleeve 15 which is slotted longitudinally and provided with angularly spaced ribs 16 connecting the ring portions at its upper and lower ends. The part 17 forms the upper portion of the rotary member, which is mounted for rotation on the base around the stand 12 by means of the several bearings 18.

Figure 3:
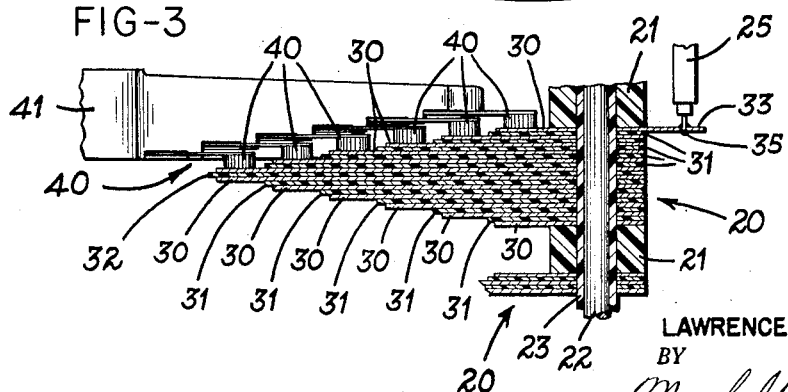
Fig. 3 is an enlarged fragmentary section showing the construction of one of the composite ring units of Figs. 1 and 2 and taken substantially on the line 3—3 of Fig. 2.

These portions of the base and rotary member carry the multiple slip ring joints for transferring a comparatively large number of electrical circuits therebetween, and these circuits may include both high load and low load circuits such for example as the pulse and echo circuits respectively of a radar tracking mechanism. The rotary member 15 carries a plurality of composite ring units indicated generally at 20 and one of which is shown in detail in Fig. 3. These ring units 20 are mounted on the rotary member by means of insulator rings 21, elongated bolts 22 in insulating sleeves 23 and a clamping ring 24, which is shown as bolted to the lower part of the rotary member 15. The connecting leads within the rotary member for the rings in the ring units 20 are indicated at 25 and pass upwardly through a series of openings 26 through the part 17.

Each of the composite ring units 20 includes a plurality of individual relatively thin and flat contact rings 30 and annular insulating disks 31 arranged in alternating relation. The contact rings 30 are in pairs of progressively greater outer diameter, and they range progressively in the order of their outer diameters from both ends of the unit to locate the pair of maximum diameter at the axial center of the unit. The insulating disks 31 are similarly in pairs of outer diameter slightly greater than the corresponding pair of contact rings, and there is also a single insulating disk 32 positioned at the axial center of the unit between the largest pair of contact rings 30. The resulting composite ring unit thus has a stepped conical outline in section with a series of exposed annular surface portions of the several contact rings arranged on both sides of the axial center of the unit.

Figure 2:
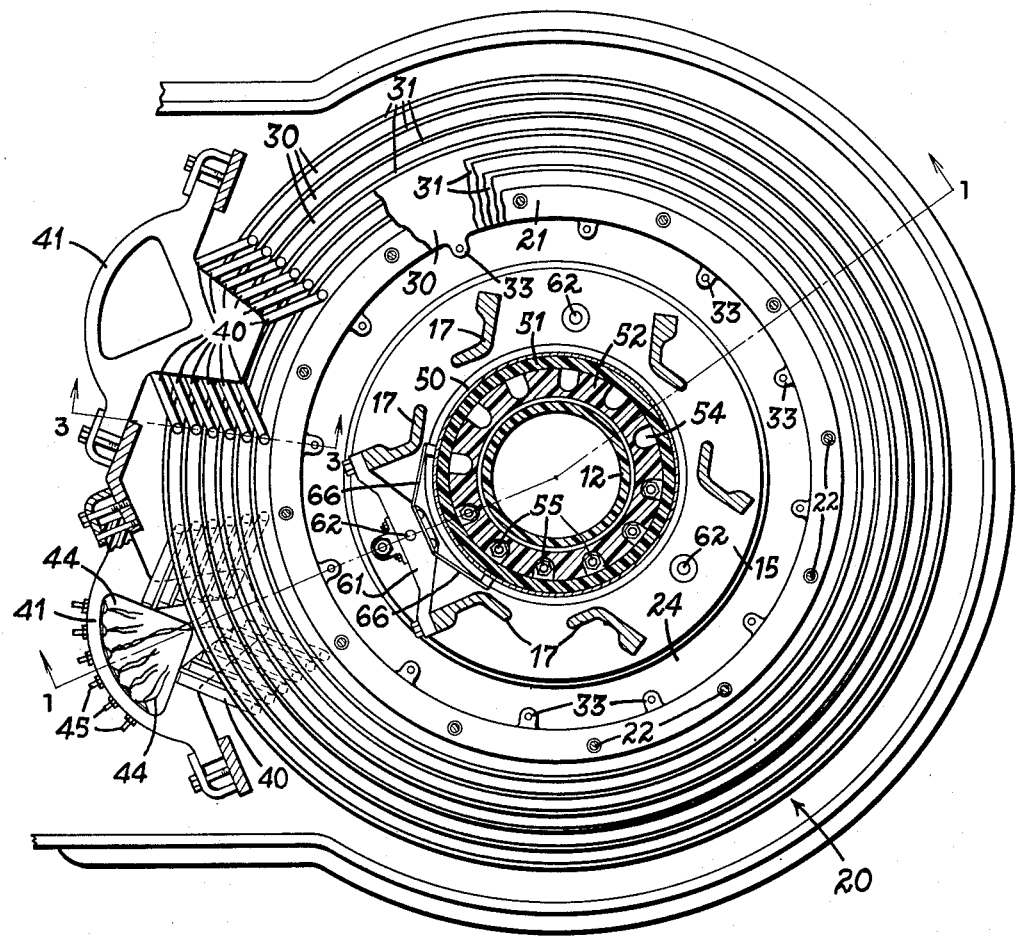
Fig. 2 is a radial section approximately on the line 2—2 of Fig. 1.

In order to establish the necessary electrical connections to the contact rings 30, each is provided with a radially inwardly projecting ear 33 on its inner periphery to which the associated lead 25 may be soldered or otherwise connected as indicated at 35. These connections are facilitated by arranging the contact rings in each composite ring unit with their respective ears 33 in angularly spaced relation around the inner periphery of the unit as shown in Fig. 2. It is thus relatively simple to effect all necessary connections to each composite ring unit while still maintaining adequate insulation.

The connections to the individual contact rings 30 from the base are formed by a plurality of brushes 40 of the leaf type which are adapted to engage the annular surface portions of the contact rings rather than the outer peripheries of these rings. The brushes 40 for each composite ring 20 are carried by a pair of brush holders 41 mounted on vertical ribs 42 connected between the base 10 and the upper portion of the base wall 11, and in order to divide the load, there may be a pair of brushes for each ring 30 as shown, with the leads 44 therefrom being connected to terminals 45 on the brush holders. With the brushes 40 thus provided in pairs, the brush holders 41 for each composite ring are conveniently arranged in axially and angularly offset relation as shown in Figs. 1 and 2 in such manner that one brush holder carries the brushes for the contact rings 30 in the upper half of the associated composite ring, while the other brush holder carries the brushes for the lower half of the composite ring, thereby providing adequate clearance between all the brushes.

This composite ring structure having contact surfaces arranged in axially and radially offset relation makes possible the transfer of a correspondingly large number of electric circuits between the stationary base and rotary member with a corresponding minimum requirement of axial space, and this construction is especially advantageous where relatively light load circuits are involved and have correspondingly low shielding requirements. At the same time, this overall construction also facilitates the provision of additional slip ring joints within the rotary member which may advantageously carry high load circuits having relatively severe shielding requirements, such for example as the pulse circuits in a radar tracking unit wherein the echo circuits are transmitted through the composite rings 20.

Referring to Fig. 1, a plurality of contact rings 50 are mounted on the stationary stand 12 by means of insulating separators 51, an insulating spacer sleeve 52 and the clamp ring 24. The lead for each pulse circuit is shown as a coaxial cable 53 threaded through the base and into one of the series of slots 54 in the side of the sleeve 52 to a terminal assembly 55 including a pigtail 56 connected to the associated ring 50. The shielded ground circuit of the cable 53 is attached to an ear 57 soldered into a slot machined into an adjacent ring 50.

Two such cable connections and their cooperating brushes are shown in Fig. 1. The cable 60 from the rotary member leads through one of the openings 26 to a brush holder 61 mounted on a pair of the ribs 17 and on one of a series of rods 62 carried by the rotary member 15 and locked thereon by means of rings 63. Each brush holder 61 carries a pair of brushes 65 and 66 engaging the corresponding pair of rings 50 to which the connections 56 and 57 are made. The pigtail 67 for cable 60 is accordingly connected with the brush 65, and the shielded ground of cable 60 is connected to the brush 66.

It will accordingly be seen that this invention provides a multiple slip ring joint construction having outstanding practical advantages. In particular, the invention makes possible the transfer of a great number of circuits through a slip ring joint having only moderate requirements of space, both axially and radially. For example, it is practical to construct the device of the invention proportioned as shown in Fig. 1 wherein each composite ring 20 includes twelve contact rings and yet is only ¾ inch in thickness, and with each insulator ring 21 ⅜ inch in thickness, it is still possible to assemble ten units 20 carrying a total of 120 circuits in an axial space of less than one foot. In comparison, if a ring structure of the type employed at 50 for the pulse circuits were used, the axial space requirements for the number of circuits would be of the order of ten times as great. At the same time, the composite ring construction of the invention facilitates inclusion in the same device of the shielded ring unit for transmitting heavy load circuits without increasing the overall axial dimensions of the device.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A multiple slip ring joint for transferring a large number of electric circuits between a stationary base and an annular rotary member on said base and including a plurality of high load circuits and also a plurality of comparatively low load circuits, comprising a stand on said base extending in telescoping relation within and supporting said rotary member, a plurality of contact rings mounted on said rotary member in axially and radially offset and insulated relation, means for connecting said rings to said plurality of low load circuits on said rotary member, a plurality of brushes equal in number to said rings, means for connecting said brushes to said plurality of low load circuits on said base, means for supporting said brushes on said base with each said brush in electric contact with an associated said ring, an additional plurality of contact rings mounted on said stand, means on said stand maintaining said additional rings in spaced and insulated relation providing effective shielding therebetween under high load conditions, an additional plurality of brushes mounted on said rotary member and each in electric contact with one of said additional rings, means for connecting said additional brushes to said plurality of high load circuits on said rotary member, and means for connecting said additional rings to said plurality of high load circuits on said base.

2. A multiple slip ring joint for transferring a large number of electric circuits between a stationary base and a rotary member on said base, comprising means supporting said rotary member for rotation on said base about a fixed axis, a plurality of flat contact rings mounted on said rotary member, said rings being arranged in opposed pairs of the same inner diameter and progressively greater outer diameter to form a composite ring of generally conical section with the pair of said rings of maximum outer diameter at the center thereof, insulating separators between adjacent said contact rings and of controlled progressively greater outer diameter to provide stepped exposed annular surface portions of said contact rings on both sides of said composite ring, means for connecting said contact rings to a corresponding plurality of circuits on said rotary member, a plurality of brushes equal in number to said contact rings, means for connecting said brushes to a corresponding plurality of circuits on said base, and means supporting said brushes on said base with each said brush in electric contact with said exposed surface portion of the associated said contact ring.

3. A multiple slip ring joint for transferring a large number of electric circuits between a stationary base and a rotary member on said base, comprising means supporting said rotary member for rotation on said base about a fixed axis, a plurality of flat contact rings mounted on said rotary member, said rings being arranged in opposed pairs of the same inner diameter and progressively greater outer diameter to form a composite ring of generally conical section with the pair of said rings of maximum outer diameter at the center thereof, insulating separators between adjacent said contact rings and of controlled progressively greater outer diameter to provide stepped exposed annular surface portions of said contact rings on both sides of said composite ring, means for connecting said contact rings to a corresponding plurality of circuits on said rotary member, there being a plurality of said composite rings arranged in axially stacked relation on said rotary member, a plurality of groups of brushes each equal in number to one-half the number of said contact rings in each said composite ring, a brush holder for each said group of brushes adapted to hold said brushes in electric contact with said exposed surface portions of the associated said contact rings, and means on said base supporting said brush holders in alternating angularly offset relation to maintain all of said brushes in said contacting relation with said contact rings.

4. A slip ring joint for transferring electric circuits between a stationary base and a rotary member on said base comprising a plurality of alternating flat contact rings and flat insulating disks forming a composite ring unit, said contact rings being of different outer diameters and being arranged in pairs with a pair of minimum outer diameter at opposite ends of said ring unit and with the pair of maximum outer diameter at the center of said ring unit, said disks being similarly arranged in pairs with each said disk being of outer diameter intermediate the outer diameter of the adjacent said rings to leave exposed surfaces of said rings in stepped angularly and axially offset relation on said ring unit, a single said insulating disk of greater outer diameter than the largest said rings positioned between said largest pair of said rings, a plurality of brushes equal in number to said rings, means for holding said brushes with each thereof in radially overlapping electric contact with an associated said ring, and means for mounting said ring unit and said brush holding means one on said rotary member and the other on said base.

5. A composite ring unit for use in a multiple slip joint comprising a plurality of alternating flat contact rings and flat annular insulating disks arranged in alternating relation, said contact rings including a plurality of pairs with each said pair being of different outer diameter than the other said pairs, said contact rings being arranged progressively in descending order of outer diameter from the axial center of said composite ring, said insulating disks being similarly arranged in pairs with each said disk being of outer diameter intermediate the outer diameters of the adjacent said contact rings to leave exposed surfaces of said rings in stepped radially and axially offset relation on both sides axially of said composite ring, a single said insulating disk of greater outer diameter than the largest said rings positioned between said largest pair of said rings, said rings and said disks being all of substantially the same inner diameter, and each said contact ring having a radially inwardly projecting ear thereon forming a contact for connection to an electric circuit.

6. A multiple slip ring joint for transferring a large number of electric circuits between a stationary base and an annular rotary member on said base and including a plurality of high load circuits and also a plurality of comparatively low load circuits, comprising a stand on said base extending in telescoping relation within said rotary member, a plurality of composite rings mounted on said rotary member, each of said composite rings including a plurality of contact rings arranged in insulated and in axially and radially offset relation in both directions axially from the axial center of said composite ring to provide a corresponding plurality of exposed radially and axially offset annular surface portions of said contact rings on each said composite ring, a plurality of brushes equal in number to all of said contact rings in said composite rings, means for supporting said brushes on said base with each said brush in radially overlapping electric contact with an associated said exposed annular ring surface on one of said composite rings, means for connecting said brushes and said rings to said low load circuits on said base and said rotary member respectively, an additional plurality of contact rings mounted on said stand, means on said stand maintaining said additional rings in spaced and insulated relation providing effective shielding therebetween under high load conditions, an additional plurality of brushes mounted on said rotary member and each in electric contact with the outer periphery of one of said additional rings, means for connecting said additional brushes to said plurality of high load circuits on said rotary member, and means for connecting said additional rings to said plurality of high load circuits on said base.

References Cited in the file of this patent

UNITED STATES PATENTS

| 1,347,970 | Overstreet | July 27, 1920 |
| 2,395,899 | Morrow | Mar. 5, 1946 |
| 2,451,959 | Knudsen | Oct. 19, 1948 |